United States Patent Office 2,916,607
Patented Dec. 8, 1959

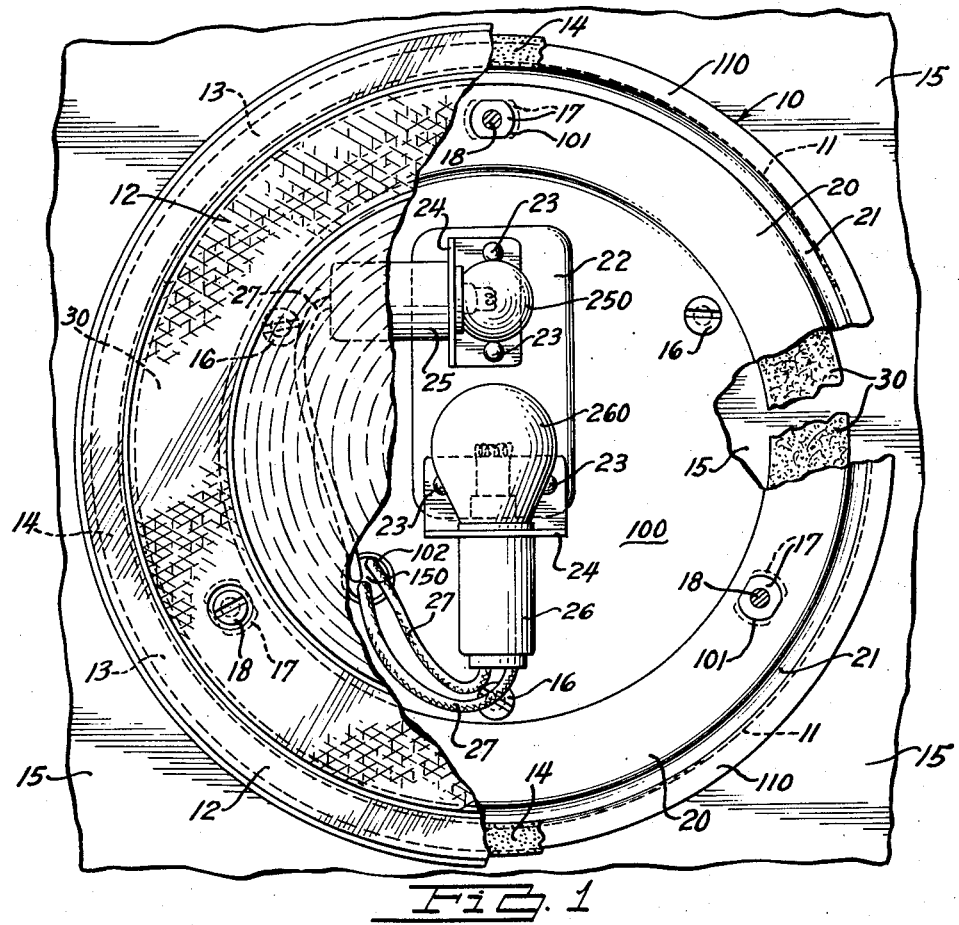
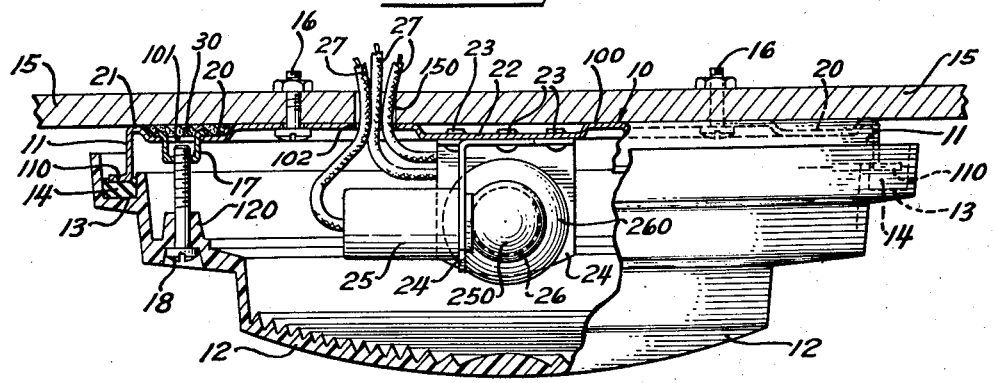
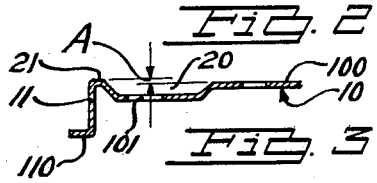

2,916,607

TAIL LIGHTS

Theodore Bargman, Detroit, Mich.

Application December 23, 1957, Serial No. 704,366

1 Claim. (Cl. 240—8.3)

This invention relates to improvements in tail light construction particularly adapted for installation on a rear panel of vehicles such as house trailers, trucks and the like.

The primary object of the invention is to provide an improved yet inexpensive vehicle tail light for trailers and the like which is easily and readily installed and made weather-tight in respect to a flat surface against and onto which it is mounted.

Other objects of the invention will become apparent by reference to the following detailed description taken in connection with the accompanying drawing, in which:

Fig. 1 is a rear elevational view of a tail light mounted on a trailer or truck panel, parts being broken away to clearly illustrate the preferred construction and installation.

Fig. 2 is a top elevational view of the tail light disclosed in Fig. 1 with parts broken away to show a portion thereof in section.

Fig. 3 is a fragmentary sectional view of the mounting plate.

Referring now to the drawing wherein like reference characters refer to like and corresponding parts throughout the several views, the particular embodiment of the invention disclosed for illustrative purposes consists generally of a circular mounting plate 10 of relatively thin metal having an annular rearwardly outstanding peripheral flange 11 therearound preferably having an annular outer lip 110 over which a tail light lens 12 is mounted, the said tail light lens 12 having a forwardly facing annular weather seal channel 13 therearound into which an annular resilient rubber or neoprene washer 14 is disposed. The said mounting plate may be secured to a trailer or truck panel 15 by suitable bolts 16, or by studs or self-tapping screws if preferred. The tail light lens 12 is secured to the mounting plate 10 by such suitable means as threaded U-shaped fasteners 17 positioned in apertures 101 provided in the mounting plate 10, and studs 18 extending through apertured bosses 120 provided in the lens 12 and threaded into the said U-shaped fasteners 17.

The mounting plate 10 has a forwardly facing flat annular sealer recess 20 formed therein adjacent the rearwardly outstanding flange 11 thereof leaving a rearwardly facing annular sealer lip 21 therearound. The said sealer lip 21 is formed in a plane slightly forward of the forward face of the main central portion 100 of the said mounting plate 10 providing an offset A as shown in Fig. 3. The central portion 100 of the mounting plate 10 is suitably debossed at 22 to accommodate the heads of rivets 23 employed to secure light brackets 24 in place. The usual electric light sockets 25 and 26 carrying tail light and/or stop light bulbs 250 and 260 are mounted in the bracket 24, and insulated wires 27 from the said sockets 25 and 26 are led through an aperture 102 in the mounting plate 10 and a complementary aperture 150 in the trailer or truck panel 15. A suitable soft rubber grommet (not shown) may be disposed through the apertures 102 and 150 to prevent chafing of the insulation of the insulated wires 27.

According to the particular electrical installation and the number and style of lights employed, a tail light embodying the invention may be either a tail light, or a stop light, or a combination tail light and stop light. Also, any selected style of lens 12 may be used provided it includes a weather sealing channel and is securable to the mounting plate in the manner hereinbefore described.

In installing the tail light, the forward face of the circular mounting plate 10 is generously "buttered" with a mastic cement 30 at the sealer recess 20 therein, using an amount of mastic slightly in excess of that required to fill the said recess. The wires 27 are pushed through the apertures 102 and 150 in the mounting plate 10 and the trailer or truck panel 15 respectively, and the said mounting plate 10 is secured to the said panel 15 by suitable securing means such as the bolts 16. The initial tightening of the securing bolts 16 first pulls the annular sealer lip 21 of the mounting plate 10 tightly against the panel 15 and thereby provides a positive annular retainer for the mastic cement 30 at the outer periphery of the said mounting plate 10. Further tightening of the securing bolts 16 pulls the main central portion 100 of the mounting plate 10 tightly against the said panel 15. Mastic cement 30 in excess of the amount required to fill the sealer recess 20 in the mounting plate 10 is forced between the said mounting plate 10 and the said trailer or truck panel 15. This construction assures a permanent weatherproof mounting of the tail light mounting plate 10 to the panel 15. The tail light lens 12 is then positioned over the annular rearwardly extending flange 11 of the mounting plate 10 with the forwardly facing weatherseal channel 13 of the said lens 12 and the annular compressible washer 14 positioned in said weatherseal channel 13 located in registry with the annular lip 110 of the said annular flange 11. The tail light lens is then tightly secured to the mounting plate 10 by threading the studs 18 to refusal into the U-shaped fasteners 17. This embeds the said annular lip 110 of the annular rearwardly extending flange 11 of the mounting plate 10 into the annular compressible washer 14 and expands the said washer 14 to fill the said annular weatherseal channel 12.

The invention thusly provides an improved, inexpensive, easily installed and positively weather-tight tail light or tail and stop light, as the case may be, that meets all of the requirements for installation on the rear panels of house trailers, trailers and trucks, the said improved tail light requiring no special formation in the panels on which they are mounted to accommodate the same.

Although but a single embodiment of the invention has been disclosed herein and described in detail, it is obvious that many changes may be made in the size, shape, arrangement and detail of the various elements of the invention as defined by the appended claim.

I claim:

A tail light for vehicles mountable on a rear flat panel thereof comprising a circular mounting plate including a central portion and an annular rearwardly outstanding peripheral flange, the said central portion of said mounting plate having a forwardly facing annular recess therein adjacent said flange to accommodate mastic cement, a forwardly extending annular peripheral lip formed between said flange and adjacent said annular recess extending forwardly with respect to the forward plane of the said central portion of said mounting plate, the said central portion of said mounting plate being axially flexible with respect to the said peripheral flange and said lip, means securing the said mounting plate at its central portion to said vehicle panel causing said forwardly extending annular peripheral lip thereof to engage said vehicle panel and confine any excess mastic cement placed in said annular recess to within said peripheral lip while urging any said excess of mastic cement from said annular recess to between said central portion of said mounting plate and said vehicle panel, light means mounted on the central portion of said mounting plate extending rearwardly therefrom, fasteners carried by said mounting plate at the said annular recessed portion thereof, a lens including a forwardly facing weatherseal channel carrying a resilient washer therein telescoped over said rearwardly outstanding peripheral flange of said circular mounting plate, and means extending through said lens engaging said fasteners and securing said lens to said mounting plate.

References Cited in the file of this patent
UNITED STATES PATENTS 2,700,726     Bassler _____ Jan. 25, 1955

FOREIGN PATENTS 1,010,669     France _____ Mar. 26, 1952